UNITED STATES PATENT OFFICE.

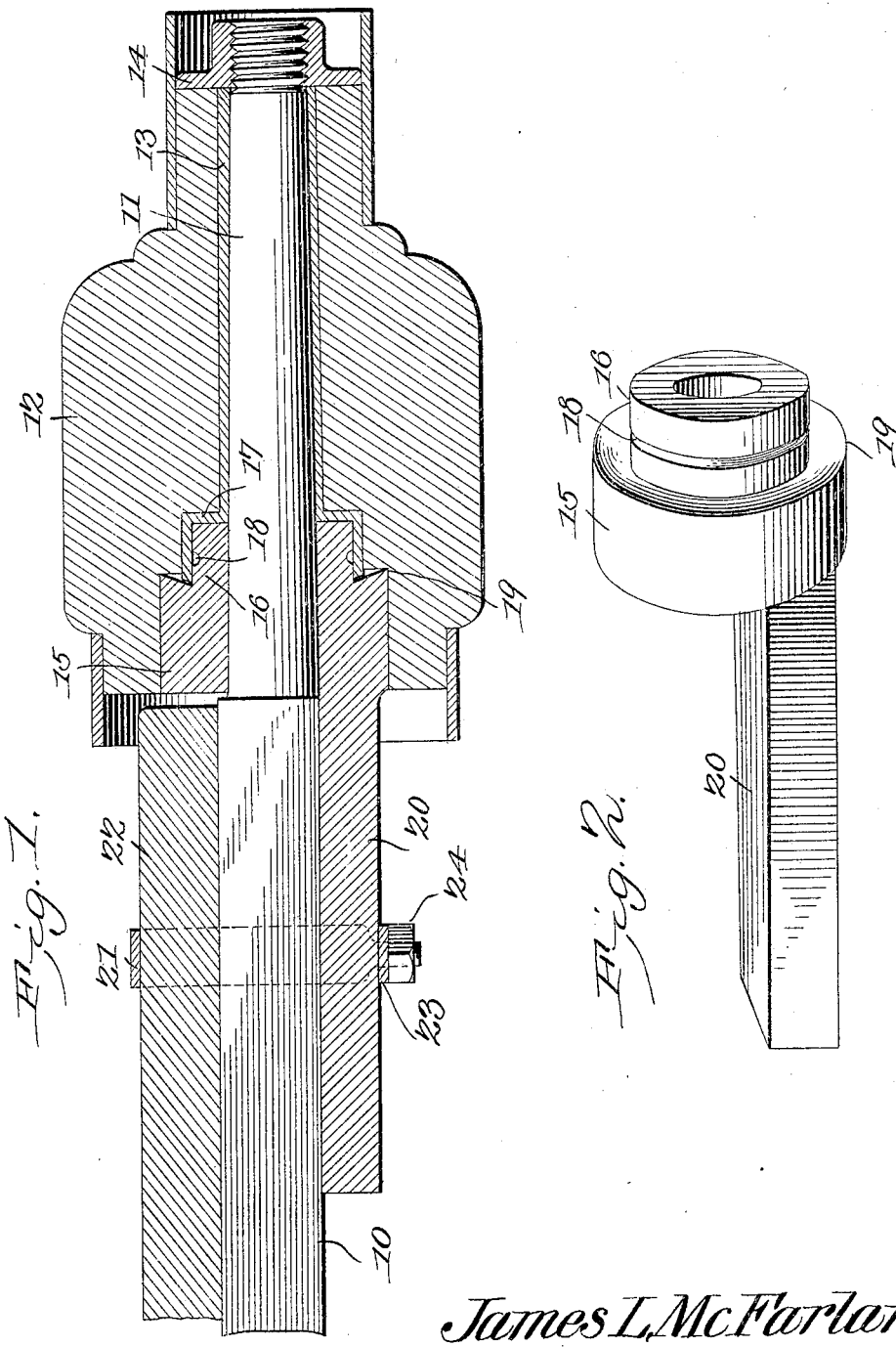

JAMES L. McFARLANE, OF GEORGETOWN, ILLINOIS, ASSIGNOR OF ONE-HALF TO JAMES M. FRAZIER, OF GEORGETOWN, ILLINOIS.

VEHICLE-AXLE.

No. 820,433. Specification of Letters Patent. Patented May 15, 1906.

Application filed September 25, 1905. Serial No. 279,997.

*To all whom it may concern:*

Be it known that I, JAMES L. MCFARLANE, a citizen of the United States, residing at Georgetown, in the county of Vermilion and State of Illinois, have invented a new and useful Vehicle-Axle, of which the following is a specification.

This invention relates to vehicle-axles, and has for an object to provide a device of the class embodying new and improved features of durability, economy, utility, and efficiency.

A further object of the invention is to provide an axle embodying improved means to compensate for the usual wear incident to operation.

Specifically the object of the invention is to provide an axle having a collar mounted and longitudinally movable upon the spindle and abutting against the inner end of the hub-thimble and a clip to clamp it to the axle, whereby it may be moved and clamped to take up wear.

It is well known that it is customary to compensate for wear in vehicle-hubs by the use of leather or other gaskets placed upon the spindle and between the outer end of the thimble and the retaining-nut. The gaskets commonly used are from three-sixteenths to three-eighths of an inch in thickness, and it is obvious that wear to such an extent must be allowed before a new gasket can be applied.

It is an object of this invention to provide improved means whereby all wear may at any time be taken up even to the smallest fraction of an inch, thereby insuring a perfect bearing.

With these and other objects in view the present invention consists in the combination and arrangement of parts, as will be hereinafter fully described, shown in the accompanying drawings, and particularly pointed out in the appended claim, it being understood that changes in the form, proportion, size, and minor details may be made without departing from the spirit or sacrificing any of the advantages of this invention.

In the drawings, Figure 1 is a longitudinal sectional view of an axle embodying this invention. Fig. 2 is a perspective view of the collar and its shank which is mounted upon the axle and spindle.

Like characters of reference indicate corresponding parts in both of the figures of the drawings.

The improved axle forming the subject-matter of this application comprises an axle-bar 10 of substantially the usual construction, preferably square or polygonal in cross-section, although it will be obvious that any form may be used. The axle-bar 10 carries a spindle 11 of substantially the usual form, upon which is mounted a hub, as 12, which may have a thimble, as 13, and be retained in position by the usual nut 14. The usual collar abutting against the inner end of the hub or thimble is replaced by a collar 15, mounted and longitudinally movable upon the spindle and having a reduced portion 16 to fit within the inner end 17 of the thimble and provided with a sand-groove 18. The inner end of the hub may abut against the shoulder 19, or the hub may have an internal annular shoulder for contact with the shoulder 19. The collar is provided with a rigid shank 20, extending along the under side of and conforming substantially in width to the axle-bar 10, and a clip 21 is provided to embrace the shank 20, axle-bar 10, and axle wood 22 where such wood is used. The clip 21 is provided with the usual plate 23 and clamping-nuts 24 for clamping the shank to the axle-bar.

It will be readily understood that wherever wear occurs which would cause longitudinal play of the hub upon the spindle the clip 21 may be loosened and the collar moved into contact with the inner end of the hub or thimble.

Having thus described the invention, what is claimed is—

In a vehicle-axle, a spindle, a hub, mounted upon the spindle and provided with a concentric cavity within its inner end, a collar mounted and longitudinally movable upon the spindle and contained wholly within the cavity a shank carried rigidly by the collar and in contact with the axle, and means to connect the shank rigidly and adjustably to the axle.

In testimony that I claim the foregoing as my own I have hereto affixed my signature in the presence of two witnesses.

JAMES L. McFARLANE

Witnesses:
W. D. SANDERS,
J. I. GRUBB.